US008894397B2

(12) United States Patent
Candiracci

(10) Patent No.: US 8,894,397 B2
(45) Date of Patent: Nov. 25, 2014

(54) PROCESS AND DEVICE FOR PRODUCING BLOCKS OF MATERIAL

(76) Inventor: Angelo Candiracci, Località Rosciano (IT)

( * ) Notice: Subject to any disclaimer, the term of this patent is extended or adjusted under 35 U.S.C. 154(b) by 805 days.

(21) Appl. No.: 12/530,097

(22) PCT Filed: Feb. 28, 2008

(86) PCT No.: PCT/IB2008/000437
§ 371 (c)(1),
(2), (4) Date: Dec. 18, 2009

(87) PCT Pub. No.: WO2008/107758
PCT Pub. Date: Sep. 12, 2008

(65) Prior Publication Data
US 2010/0092597 A1    Apr. 15, 2010

(30) Foreign Application Priority Data

Mar. 8, 2007    (IT) ............................... PS2007A0011

(51) Int. Cl.
| B29C 44/20 | (2006.01) |
| B29C 44/26 | (2006.01) |
| B29C 44/34 | (2006.01) |
| B29C 44/58 | (2006.01) |
| B29C 44/44 | (2006.01) |

(52) U.S. Cl.
CPC ............. *B29C 44/26* (2013.01); *B29C 44/3426* (2013.01); *B29C 44/58* (2013.01); *B29C 44/445* (2013.01)
USPC ............. 425/4 C; 425/63; 425/142; 425/308; 425/311; 425/442; 425/817 C; 425/505; 425/514

(58) Field of Classification Search
CPC   B29C 43/224; B29C 44/206; B29C 44/0469; B29C 47/54; B29C 67/222; B29C 44/26; B29C 44/445; B29C 44/58; B29C 67/223; B29C 67/225; B29C 67/227; B28B 5/027
USPC ...... 425/4 C, 296, 308, 310, 441, 442, 817 C, 425/63, 108, 142, 295, 311, 398, 450.1, 425/505, 510, 515, 514
See application file for complete search history.

(56) References Cited

U.S. PATENT DOCUMENTS 2,921,346 A * 1/1960 Fischer .......................... 264/108
3,240,846 A * 3/1966 Voelker ........................ 264/46.2

(Continued)

FOREIGN PATENT DOCUMENTS

| NL | 7614289 | 6/1978 |
| WO | 85/03903 | 9/1985 |

OTHER PUBLICATIONS

International Search Report dated Oct. 15, 2008, from corresponding PCT application.

*Primary Examiner* — Seyed Masoud Malekzadeh
(74) *Attorney, Agent, or Firm* — Young & Thompson

(57) ABSTRACT

In a process and a device for producing blocks of expanded polystyrene, a loose mass (7) of polystyrene spheres is expanded in a mold (2-3), where a rear surface (9) of the polystyrene block (8) previously produced delimits the mold forming chamber. Therefore, through adherence the newly formed block (7-8) is joined to the rear end (9) of the block previously formed, and the block (8) made in this way is fed forward until it forms the rear end (9) for another newly expanded block (8), and so on to produce a sort of continuous block (8), which can be formed for cutting to any desired size, without producing any waste.

12 Claims, 7 Drawing Sheets

(56) References Cited

U.S. PATENT DOCUMENTS

| | | | | |
|---|---|---|---|---|
| 3,265,786 A * | 8/1966 | Voelker | | 264/54 |
| 3,345,442 A * | 10/1967 | Oxel | | 264/51 |
| 3,628,937 A * | 12/1971 | Schott | | 65/141 |
| 3,646,715 A * | 3/1972 | Pope | | 52/309.9 |
| 3,674,387 A * | 7/1972 | Gonon | | 425/4 R |
| 3,734,668 A * | 5/1973 | Porter | | 425/330 |
| 3,832,106 A * | 8/1974 | Rivat-Lahousse | | 425/4 R |
| 3,867,494 A * | 2/1975 | Rood et al. | | 264/45.3 |
| 3,966,381 A * | 6/1976 | Suh | | 425/376.1 |
| 3,999,736 A * | 12/1976 | Theodorsen | | 249/61 |
| 4,025,257 A * | 5/1977 | Sagane et al. | | 425/115 |
| 4,042,659 A * | 8/1977 | Botting et al. | | 264/71 |
| 4,043,719 A * | 8/1977 | Jones | | 425/115 |
| 4,147,582 A * | 4/1979 | Brollo | | 156/462 |
| 4,259,282 A * | 3/1981 | Goldsmith | | 264/148 |
| 4,275,539 A * | 6/1981 | Abbott, III | | 52/309.11 |
| 4,424,951 A * | 1/1984 | Spencer | | 249/48 |
| 4,431,393 A * | 2/1984 | Luchsinger | | 425/129.1 |
| 4,456,443 A * | 6/1984 | Rabotski | | 425/4 R |
| 4,492,663 A * | 1/1985 | Reinfeld et al. | | 264/45.4 |
| 4,514,162 A * | 4/1985 | Schulz | | 425/174.8 R |
| 4,539,167 A | 9/1985 | Schedel | | |
| 4,695,416 A * | 9/1987 | Treffner et al. | | 264/45.4 |
| 4,846,438 A * | 7/1989 | Lee | | 249/26 |
| 4,969,971 A * | 11/1990 | Ehnert et al. | | 156/500 |
| 5,264,167 A * | 11/1993 | Proksa et al. | | 264/46.2 |
| 5,275,544 A * | 1/1994 | Marlowe | | 425/4 R |
| 5,388,975 A * | 2/1995 | Proksa et al. | | 425/4 C |
| 5,505,886 A * | 4/1996 | Baugh et al. | | 264/102 |
| 5,639,483 A * | 6/1997 | Fiorentini et al. | | 425/4 C |
| 5,786,000 A * | 7/1998 | Berner | | 425/140 |
| 5,798,064 A * | 8/1998 | Peterson | | 264/46.3 |
| 6,022,205 A * | 2/2000 | Marlowe | | 425/4 C |
| 6,347,931 B1 * | 2/2002 | Underwood | | 425/62 |
| 6,520,759 B2 * | 2/2003 | Kitayama et al. | | 425/4 C |
| 7,138,077 B2 * | 11/2006 | Ehbing et al. | | 264/40.4 |
| 7,144,534 B2 * | 12/2006 | Buchel et al. | | 264/109 |
| 7,278,842 B2 * | 10/2007 | Begemann et al. | | 425/4 C |
| 7,291,234 B2 * | 11/2007 | Glorioso | | 156/78 |
| 7,302,983 B1 * | 12/2007 | Chuang | | 156/459 |
| 7,575,427 B2 * | 8/2009 | Sato | | 425/444 |
| 2003/0183971 A1 * | 10/2003 | Griffiths | | 264/51 |
| 2004/0022941 A1 * | 2/2004 | Glorioso | | 427/243 |
| 2005/0042436 A1 * | 2/2005 | Glorioso et al. | | 428/304.4 |
| 2006/0127664 A1 * | 6/2006 | Geary et al. | | 428/317.9 |
| 2007/0013096 A1 * | 1/2007 | Rekret | | 264/45.5 |
| 2007/0113759 A1 * | 5/2007 | Roth et al. | | 108/161 |
| 2010/0215935 A1 * | 8/2010 | Mariezkurrena et al. | | 428/220 |

* cited by examiner

PROCESS AND DEVICE FOR PRODUCING BLOCKS OF MATERIAL

TECHNICAL FIELD

The present invention relates to a process and an apparatus for producing blocks of material.

In particular, said material consists of an insulating material, especially a plastic material, preferably an expanded material, such as expanded polystyrene.

The predetermined block is suitable for constituting a corresponding panel for producing a structure, in particular a building.

BACKGROUND ART

Expanded polystyrene is usually produced in blocks having the shape of a parallelepiped and is supplied in that form to users, who use cutting operations to obtain slabs or other three-dimensional shapes from it, necessary for their specific requirements.

Such blocks are fully formed, in a single operation, in moulds, fully perforated, into which a suitable quantity of loose polystyrene spheres is poured, which is then struck, substantially on all sides, by a flow of steam that penetrates from the walls of the mould in which there are openings, causing the mass to expand. In this way the polystyrene spheres are made to expand and stick to one another, forming a single body having the shape of a block or parallelepiped.

In the specific use of the material for producing panels, in particular for building, slabs are obtained from the above-mentioned blocks, by making a corresponding cut, slabs which, obviously, in terms of the longitudinal dimension (usually corresponding to the height of the panel when fitted) have the same length as the block produced in that way.

With reference to this, the blocks, and the relative moulds, have a limited range of standardised dimensions, in particular of lengths available, substantially corresponding to the most common height dimensions of the panel slabs produced.

When, as it is often the case, the height of the panels does not correspond precisely to the length of a standardised block, a corresponding portion of the block must be cut, consequently producing material waste, and as a result waste or problems and costs for disposal.

DISCLOSURE OF THE INVENTION

It is provided a process for producing blocks of material, the material in particular being an insulating material, especially a plastic material, preferably an expanded material, such as expanded polystyrene, the blocks preferably being for producing a structure, in particular a building, the process comprising the step of producing a working block consisting of said material, and characterised in that the working block is made by means of a plurality of forming steps.

It is also provided an apparatus for producing blocks of material, the material in particular being an insulating material, especially a plastic material, preferably an expanded material, such as expanded polystyrene, the blocks preferably being for producing a structure, in particular a building, the apparatus comprising means for forming a working block consisting of said material, and characterised in that it comprises means designed to form a working block by means of a plurality of forming steps.

In this way, a working block can be obtained having suitable and desired dimensions, preferably for producing a corresponding block of the desired length, in particular for producing corresponding panels of corresponding length, thus avoiding the production of waste material requiring appropriate treatment, as used to occur in accordance with the prior art.

These and other characteristics of the process and the apparatus are clearly described in the claims herein.

BRIEF DESCRIPTION OF THE DRAWINGS

The technical features and various advantageous aspects of the process and the apparatus are more apparent from the detailed description which follows, with reference to the accompanying drawings which illustrate preferred embodiments of the invention provided merely by way of example without restricting the scope of the inventive concept, and in which.

DETAILED DESCRIPTION OF THE PREFERRED EMBODIMENTS OF THE INVENTION

Figure 1:
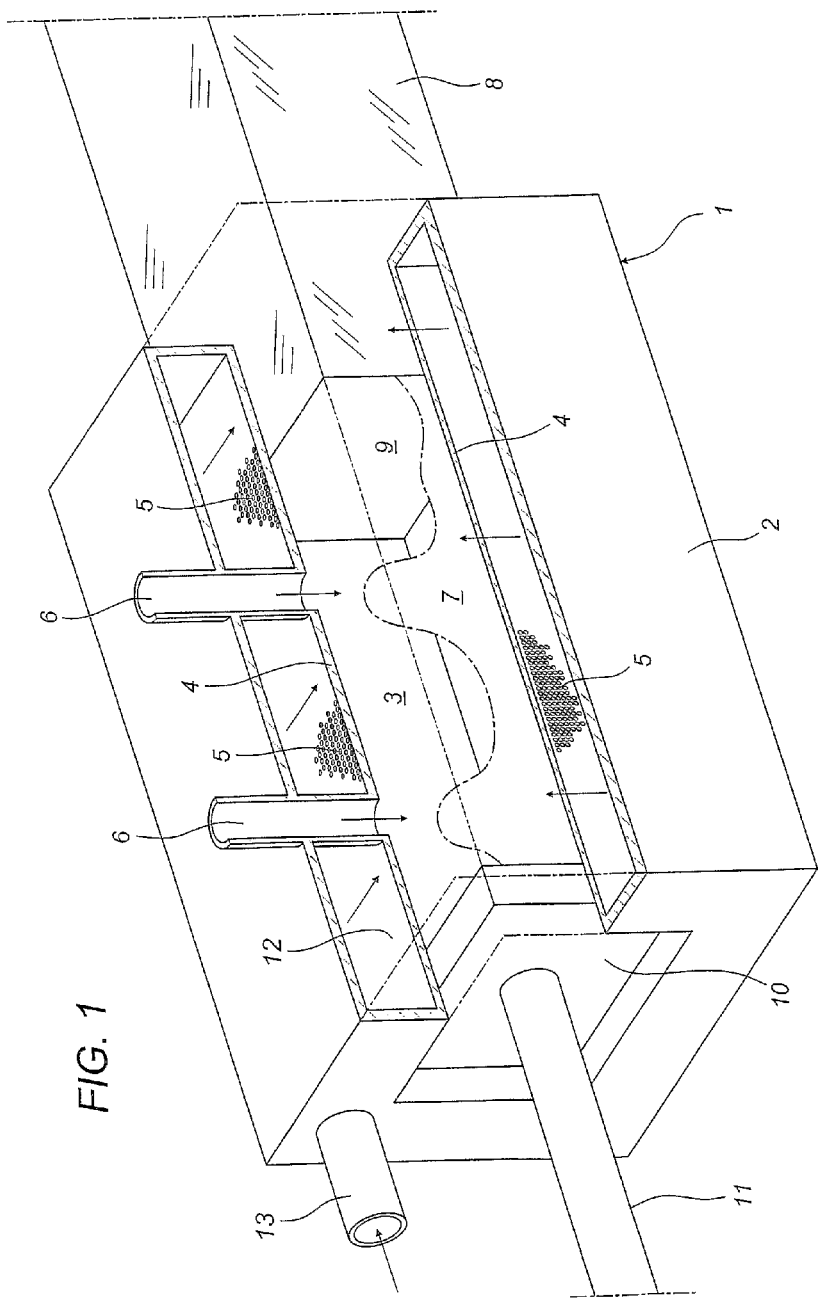
FIG. 1 is a schematic view, partly in cross-section, of a first preferred embodiment of an apparatus in particular for implementing the process in accordance with the present invention, in a first operating condition.

The present process for producing blocks of material, which for better understanding is described with reference to the apparatus illustrated in FIGS. 3 to 6, involves the production of a working block 51, consisting of said material, from which at least one corresponding predetermined block 53 is obtained.

In particular, the material is an insulating material, especially a plastic material and, preferably, an expanded material, such as expanded polystyrene.

In turn, the predetermined block is, in particular, suitable for constituting a corresponding panel for producing a structure, in particular a building.

Advantageously, according to the process, the working block 51 is produced by means of a plurality of separate forming steps.

Advantageously, the working block 51 is produced by means of a plurality of successive steps, in particular, moulding, for forming the block.

In particular, as illustrated, the working block 51 has the shape of a longitudinally extended block.

Advantageously, according to this process the predetermined block 53 is obtained by separating the predetermined block 53 from the working block 51.

Also, advantageously, the working block 51 is reconstructed, or renewed.

In particular, corresponding with the step of separating a predetermined block 53 from the working block 51 there is a step of reconstruction of the working block 51.

In practice, the working block 51 is reconstructed by adding corresponding material, and, in particular, by adhesion of a corresponding block 55 of material to the working block 51.

In practice, material is formed to restore the working block 51.

This restoring material is added to the working block 51 material and takes the form of a basic block of material 55, which is formed and, simultaneously, added to the working block 51.

In practice, as becomes more clear below, the basic block 55, subsequently formed, is added to the working block 51 during the step of forming the basic block 55.

For this purpose, as it is better inferred from the following description, the basic block of material 55 is added to the working block 51, by forming the same basic block 55 in contact with one rear end, or face 51a of the working block 51. In this way, the basic block of material 55, subsequently formed, adheres to the working block 51, forming a single body with the latter.

As it is more clearly indicated later in this description, the basic block 55 is formed in a corresponding mould 52.

In practice, starting with a single mould 52 a working block 51 is produced whose length is greater than the length, or the corresponding dimension, of the mould 52.

Figure 3:
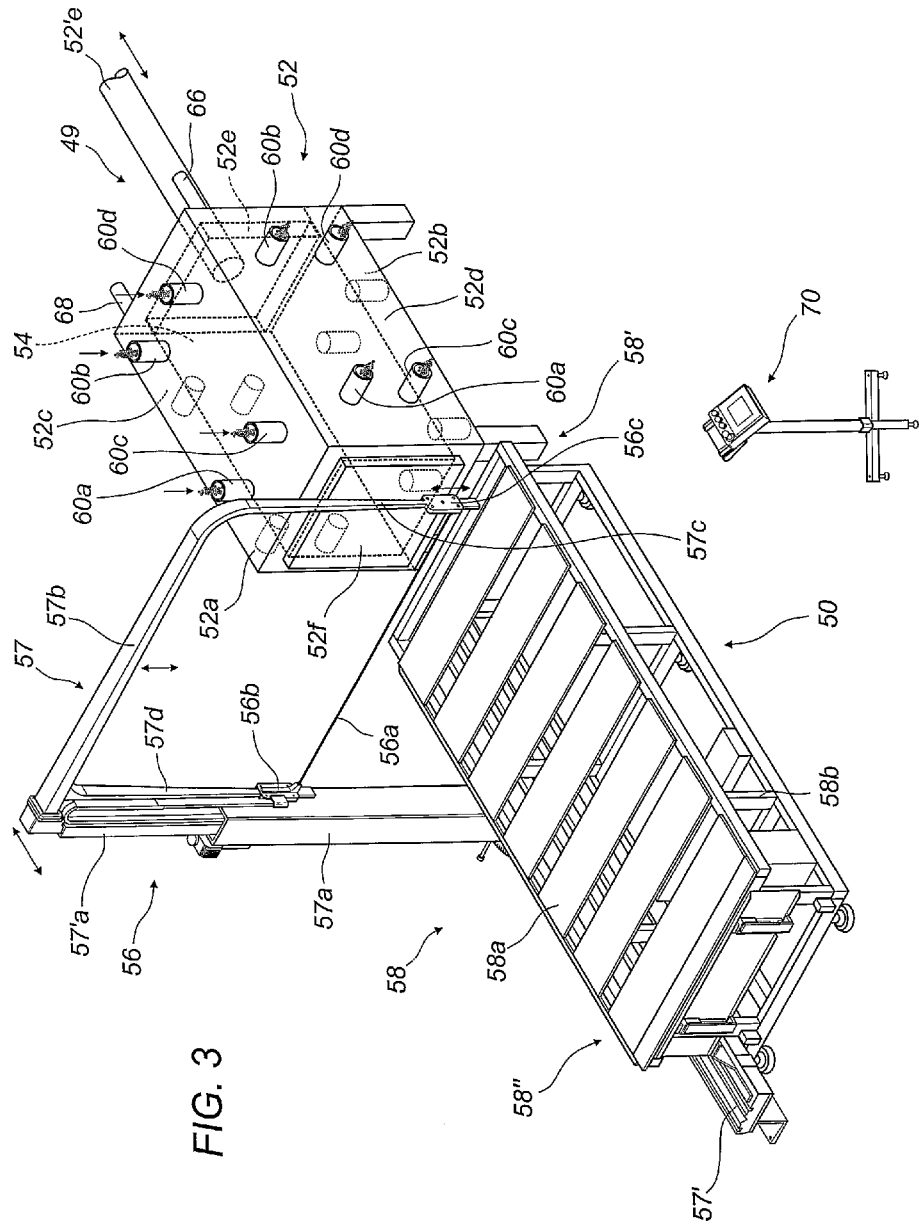
FIGS. 3, 4, and 5 are perspective views of a second preferred embodiment of the apparatus in accordance with the present invention, in various operating conditions.

As illustrated in FIG. 3, the process involves forming a first block which constitutes the working block 51 with the mould closed.

Then, according to the process, advantageously, the subsequent basic blocks 55 are formed to produce the working block 51, with the working block 51 previously formed constituting means for closing the mould forming chamber 54.

For this purpose, the working block 51 extends, or is located, outside the mould 52, having a rear end 51' located or extending inside the mould 52.

In practice, the working block 51 has corresponding lateral faces, in particular in the form of an upper face 51c, a lower face 51d and opposite side faces 51e, 51f, which are in contact with the opposite lateral faces of the forming chamber 54, said faces being the upper face 54a, the lower face 54b, and the opposite side faces 54c, 54d of the chamber 54.

In practice, the block 51 previously formed constitutes means for closing the front opening of the moulding chamber 54, during the step of forming a subsequent block 55, to be added to the block 51 already formed.

Material forming involves feeding, or injecting, the material into the forming chamber 54 of a mould 52. The material is preferably in the form of polystyrene spheres to be expanded and made to adhere to one another.

Moreover, a working fluid, preferably steam, is also fed or injected into the mould 52 forming chamber, to achieve said expansion and reciprocal adhesion of the polystyrene spheres.

Moreover, advantageously, said working fluid is also extracted from the mould 52, thus promoting and accelerating drying of the block just formed.

According to the process, the working block 51 is fed or moved forward with alternating feed-dwell stretches. In particular, during the feed steps, the working block 51 is fed forward by one stretch, or stroke "Ls" which is less than the length of the mould 52.

In this way, the material is not completely expelled from the moulding chamber, and during the subsequent forming step can constitute, with its rear face 51a and the corresponding inner faces, in particular the lateral faces 54a, 54b, 54c, 54d and rear face 54e, corresponding walls of the mould, space or compartment for forming a block of material 55.

In particular, advantageously, material 55 is added to the working block 51 during the dwell steps in the feed movement. In practice, the basic block 55 to be added to the working block 51 is formed during the working block dwell step.

As indicated, according to the process, advantageously a predetermined block 53 of material is separated from the working block 51. Advantageously, said separation is substantially simultaneous with the forming and addition of the material 55 to the working block 51.

In practice, material is continuously separated from the working block 51 and new material is continuously added to the block 51.

The predetermined block 53 is separated from the working block 51 during the working block 51 dwell steps.

As illustrated, the working block 51 extends longitudinally and has a corresponding quadrangular cross-section. However, it shall be understood that the working block 51 could have any desired shape.

As illustrated, the predetermined block 53 separated from the working block 51 corresponds to a front longitudinal part or portion 51" of the working block 51.

In particular, as described in more detail below, the predetermined block 53 is cut from the working block 51, the separating cut being labelled 153 in FIG. 5.

Moreover, according to the process, the predetermined block 53 is separated from the working block 51 in such a way that the predetermined block 53 has a predetermined and desired length, which can be varied as appropriate according to current requirements.

In practice, the length "Lp" of the predetermined block 53 can be selected as appropriate by modifying the distances of the cutting or separation means 56 from the mould 52, as explained in more detail below.

In practice, as illustrated, the predetermined block 53 is separated at one longitudinal end side or portion of the working block 51, whilst reconstruction material is added to the same working block 51 at the opposite longitudinal side or end.

In practice, according to the process, cutting means 56a are used which can move between a raised position allowing free transit of the working block 51 and a lowered position for cutting the working block 51, to produce a corresponding predetermined block 53, at the working block 51 dwell steps.

As illustrated, to produce the predetermined block 53 for the panel, the cutting means make a transversal cut 153 in the working block 51.

Figure 2:
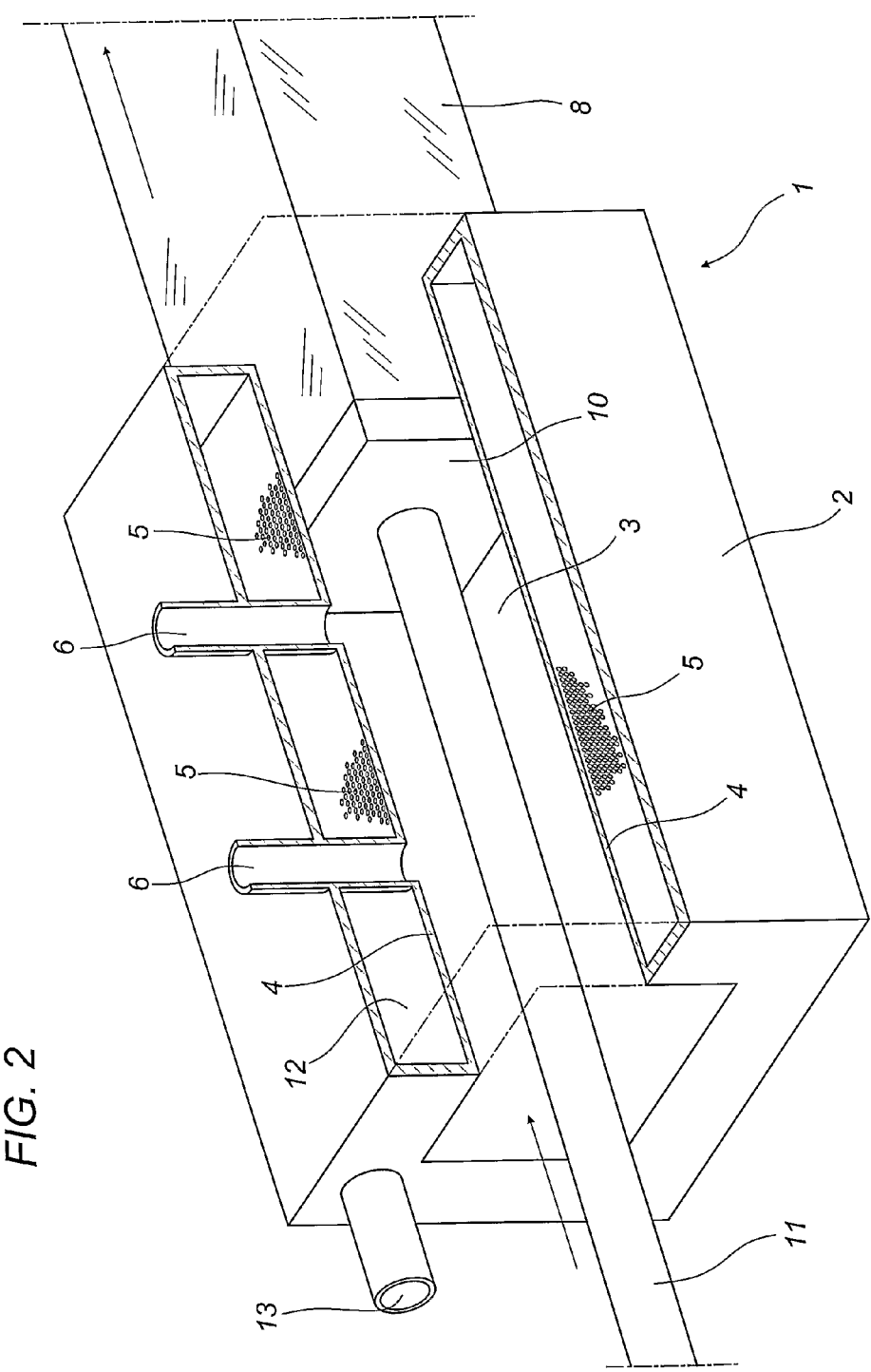
FIG. 2 is a schematic view, partly in cross-section, of the first preferred embodiment of the apparatus, in a second operating condition.

A first preferred embodiment of the apparatus is illustrated in FIGS. 1 and 2. With reference to said Figures, and in particular FIG. 1, the numeral 1 denotes as a whole an apparatus or device for producing blocks of expanded polystyrene, schematically illustrated and consisting of a mould 2 having the shape of a parallelepiped, inside which there is a similarly shaped expansion chamber 3.

The larger sides of the mould 2 consist of plates 4 fully perforated by a network of small holes 5 over the entire extension, although in the accompanying drawings only portions of them are shown as perforated by way of example.

Upper pipes 6 lead into the expansion or forming chamber 3, to inject a pre-dosed loose mass 7 of expanded polystyrene pellets, of which two are illustrated by way of example, which as a result of the process, described in more detail below, form a single body consisting of a block 8 having the shape of a parallelepiped.

The tops of the pipes 6 are connected to the means, not illustrated, for feeding and metering the pellets, for example volumetric feeders and hoppers, whilst the bottoms of the pipes are fitted with valves or gate valves, or in any event closing means, although not illustrated, aligned with the upper plate 4.

The smaller sides of the mould 2 which has the shape of a parallelepiped consist of the base 9, or rear, of the pre-formed block 8 of expanded polystyrene and, longitudinally distanced from the base 9, of the suitably shaped plate 10 of a pusher 11, which is operated in any known way suitable for the purpose.

Around the larger sides 4 of the mould 2 having the shape of a parallelepiped there extends an air space 12 designed to allow the forced circulation of steam, injected from at least one pipe 13 leading into it, and which is generated and injected under pressure by any known device suitable for the purpose, for the functions specified below.

In practice, a measured quantity 7 of loose polystyrene pellets is fed into the mould 2 through the upper pipes 6. When the appropriate quantity is reached, the steam is injected into the air space 12, with forced circulation, and penetrates the expansion chamber 3 through the network of holes 5 made in the larger sides 4 of the mould 2.

Therefore, the mass of polystyrene spheres is struck on all sides by the flow of steam.

The loose mass 7 expands in the mould 2 in the known way, adopting the shape of a parallelepiped, matching the shape of the forming chamber 3.

Following said expansion of the polystyrene spheres, the expanded mass 7 makes contact with the rear surface 9 of the polystyrene block 8 previously produced and securely or inextricably adheres, or bonds, to the latter due to consubstantiality.

At this point, the movable plate 10 of the pusher 11 is made to move forward, displacing, or moving, the newly formed block 8 sealed to the previous block 8, until it moves it to a position in which the rear end 9 constitutes the connecting base for the creation of a new block, newly expanded or formed, and so on to produce a continuous block 8, which can be cut to any desired size without producing waste.

FIGS. 3 to 7 illustrate a second preferred embodiment of the apparatus 50 for producing blocks of material, in which the material is, in particular, an insulating material, especially a plastic material, and preferably an expanded material, such as expanded polystyrene.

The block obtained using the apparatus is, in turn, of the type suitable for constituting a corresponding panel for producing a structure, in particular a building.

The apparatus 50 is also particularly suitable for implementing the process disclosed.

As illustrated, the apparatus 50 comprises means for producing a working block 51, consisting of said material, from which at least one corresponding block 53 with desired and predetermined dimensions is obtained.

Advantageously, the present apparatus comprises means designed to form a working block 51 by means of a plurality of material forming steps, in particular a plurality of separate material forming steps. In particular, the forming of material consists of steps of forming the material into a block.

In this way, a working block 51 is obtained, from which at least one corresponding predetermined block is obtained, having the desired dimensions which are independent of the dimensions, in particular the length, of the moulding means used. Therefore, desired blocks 53 can be obtained from the working or intermediate block 51 without creating waste, as occurred in the prior art.

In particular, the present apparatus comprises means designed to form a working block 51, operating through a plurality of successive forming steps, that is to say, a plurality of successive material moulding steps.

In practice, in a respective step, the material is formed into a block and aggregated to constitute a working block 51.

The apparatus 50 comprises means 52 for forming a block of material, consisting of a suitable mould 52 having an inner forming chamber 54.

The present apparatus also advantageously comprises means for separating a predetermined block 53 of material from the working block 51.

The present apparatus is also such that it constitutes means for restoring the working block 51, to make up for the removal from the latter of the part corresponding to the predetermined block 53.

In practice, the restoring means of the present apparatus are designed to add material to the working block 51, from which the predetermined block 53 is separated.

In particular, the means designed to form the working block, or to restore the working block, are means designed to form a material, or designed to produce a corresponding block of material 55, which is added to the working block 51, in particular and advantageously, during the basic block 55 forming step.

In particular, the means designed to form a corresponding basic block of material 55 are designed to add the basic block 55 to the working block 51, by forming the basic block 55 in contact with one end, or transversal surface—or rear face 51*a*—of the working block 51.

In practice, forming the basic block of material 55 in contact with the rear face 51*a* of the working block 51 results in the basic block of material adhering directly to the working block 51, producing a single body with the working block 51.

The forming mould 52 is a mould which extends longitudinally and has an extended chamber 54 for housing and forming the material 55.

The mould 52 comprises a plurality of lateral or outer walls, 52*a*, 52*b*, 52*c*, 52*d*, extending longitudinally and a transversal rear wall 52*e*.

The mould 52 is also open at the front and can be closed by a transversal door 52*f*, connected in such a way that it tilts, or can move, relative to the corresponding lateral wall of the mould.

In practice, in the main condition of use, the mould 52 has a material moulding and forming chamber 54 which, at a respective longitudinal end, has an opening 54' which allows the moulded material to exit the mould.

The present apparatus also comprises means 49 suitable for feeding or moving forward the working block 51.

Said feed means 49 feed the material with alternating working block 51 feed and dwell stretches.

The feed means consist of a pusher 49, which has a stroke "Ls" that is less than the length of the mould 52, in particular less than the length of the forming chamber.

The feed means comprise a working block engagement portion, consisting of at least part or, as in the present embodiment, the whole of the rear wall 52*e* of the mould 52.

The pusher 49 also comprises a rod 52'*e*, extending from the longitudinally movable wall 52*e* of the mould 52. The rod is designed to move the wall 52*e* between a retracted position, illustrated in FIGS. 3, 5 and 6, for forming or moulding the material in the chamber 54, and a forward position for material feed and partial exiting from the moulding chamber 54, illustrated in FIG. 4.

As illustrated, the movable wall 52*e* is located on the longitudinal side opposite the opening 54' through which the material exits the mould, where the closing door 52*f* is located.

According to another advantageous characteristic, not illustrated in detail in the accompanying drawings, it would also be possible to position one of the lateral or outer walls, 52a, 52b, 52c, 52d, preferably one of the side walls 52c and 52d of the mould 52 which is suitably movable, between a forward position in which the mould is closed and a back position in which the block of material is released and the material is freely fed by the thrust from the pusher 49.

As illustrated, in normal conditions of use, the forming chamber 54 is transversally delimitated by an upper face 54a, a lower face 54b, opposite side faces 54c, 54d of the corresponding walls 52a, 52b, 52c, 52d of the mould. Longitudinally, the forming chamber is delimited, at the rear, by the front face 54e of the movable wall 52e, and at the front, by the rear face 51a of the block 51.

As illustrated, there are means 56 for cutting the predetermined block 53 from the working block 51.

In particular, as illustrated, the means 56 for separating or cutting the predetermined block of material 53 can move longitudinally relative to the mould 52, allowing a predetermined block of material to be cut which has the desired or predetermined length "Lp".

As illustrated, the cutting means 56 comprise a supporting frame 57, having a telescopic column 57a, a vertical movable element 57'a, supporting an upper cross-member 57b, from which there extend opposite vertical elements 57c, on the side opposite that of the supporting column 57a, and 57d, on the same side as the movable column 57'a, forming a portal frame supporting the cutting element 56a.

The vertical members 57c, 57d form corresponding supporting elements for transversally opposite supporting blocks 56b, 56c for a corresponding heated metal wire 56a for cutting the material. The metal cutting wire 56 extends transversally relative to the longitudinal direction of material feed and apparatus extension.

The supporting column 57a for the cutting means 57 can move on a corresponding track or guide 57', extending longitudinally in particular parallel with the block 51 supporting means 58.

In this way, the cutting means 56 can move longitudinally, in particular relative to the mould 52, and go to a position suitable for cutting predetermined blocks 53 having a suitable and desired length "Lp", which may be predetermined as needed according to requirements.

As illustrated, in this embodiment, the guide 57' is also angled longitudinally to the mould 52, that is to say to its longitudinal outer walls 52a, 52b, 52c, 52d.

As may be inferred from the accompanying drawings, the cutting element 56a, that is to say, the portal frame 57, can move between a retracted position and a forward position, or between a raised position and a lowered position. In particular, the cutting element 56a can move between retracted, or raised, position allowing free transit of the working block 51 and a forward, or lowered, position for making a cut 153 in the block 51 and separating the block 53 from the working block 51, as illustrated in FIG. 5.

In particular, the cutting element moves from the raised, or retracted, position to the lowered, or forward position during the material 51 dwell steps, coinciding with the steps of forming the basic block 55 of material in a mould 52 and of adding, or adhesion, of this block 55 to the main or working block 51.

As illustrated, the numeral 58 denotes a surface for supporting the block 51. The surface is positioned downstream of the mould 52 and is designed to also constitute working block 51 supporting means at the means for separating or cutting the predetermined block 53 from the working block 51.

The supporting surface 58 comprises a plurality of horizontal elements or boards 58a on which the material rests. The horizontal elements are supported by a suitable frame 58b.

As illustrated, the supporting surface 58 has an upstream end 58' for receiving the working block from the mould 52, at the mould 52 outfeed, and a downstream end 58" for unloading the predetermined block 53 of material, the unloading end being downstream of the separation means 56.

As illustrated, the supporting surface 58 extends downstream of the cutting or separation means 56 to such an extent that it supports at least one corresponding predetermined block 53.

Predetermined block 53 feed towards unloading from the support 58 could, advantageously, be caused by engagement with and thrust from the working block 51, fed by the pusher 49, on the block 53.

As illustrated, the supporting surface 58 is located substantially at the same height as the lower edge of the mould 52 housing chamber 54, or the lower edge of the opening through which the material exits the mould 52, so as to suitably receive the working block 51, without inducing unnecessary stresses in it.

Advantageously, there are means for feeding, in particular injecting, material into the forming chamber 54.

In particular, a predetermined quantity of material is fed into the forming chamber 54.

Advantageously, said means for feeding material into the mould are located at least at one lateral wall of the mould, and in particular, as illustrated at each lateral wall 52a, 52b, 52c, 52d of the mould.

Moreover, at a respective wall 52a, 52b, 52c, 52d, the means for feeding material into the mould comprise one or more elements for injecting the material, in particular a plurality of injecting means for the wall, distributed longitudinally and transversally to the wall.

In particular, as illustrated, there are at least four pipes for injecting or feeding material into the mould, located close to respective longitudinal and transversal ends of the mould. For each wall the means for feeding material are labelled 60a, 60b, 60c, 60d.

There are also means for feeding a working fluid, which is injected or fed into the material forming chamber 54.

Said means for feeding the working fluid are designed to feed steam at a preset pressure and consist of a plurality of holes 62, at the lateral walls of the mould 52, in particular at each of the lateral walls 52a, 52b, 52c, 52d of the mould.

As illustrated, the holes 62 for feeding steam are located at an inner portion or plate 63 of the respective lateral wall and the working fluid is conveyed towards the holes 62 thanks to corresponding chambers or air spaces 64 between the inner panel or plate and the outer panel or plate 65 of the respective lateral wall.

The working fluid, in the form of steam, is conveyed towards the air spaces 64 through a pipe at the fixed portion of the mould labelled 66.

Another pipe 68 is suitable for extracting the working fluid, so as to promote, amongst other things, drying of the moulded material.

Moreover, the numeral 70 denotes a control unit or computer for the apparatus.

Briefly, for the operation of the present apparatus, in a condition with the door closed, illustrated in FIG. 3, the material in the form of polystyrene spheres or the like is fed into the forming chamber 54, then the steam for heating and expanding the material is injected under pressure into the same chamber 54. In this way a first block of material is formed in the housing chamber 54.

Figure 4:
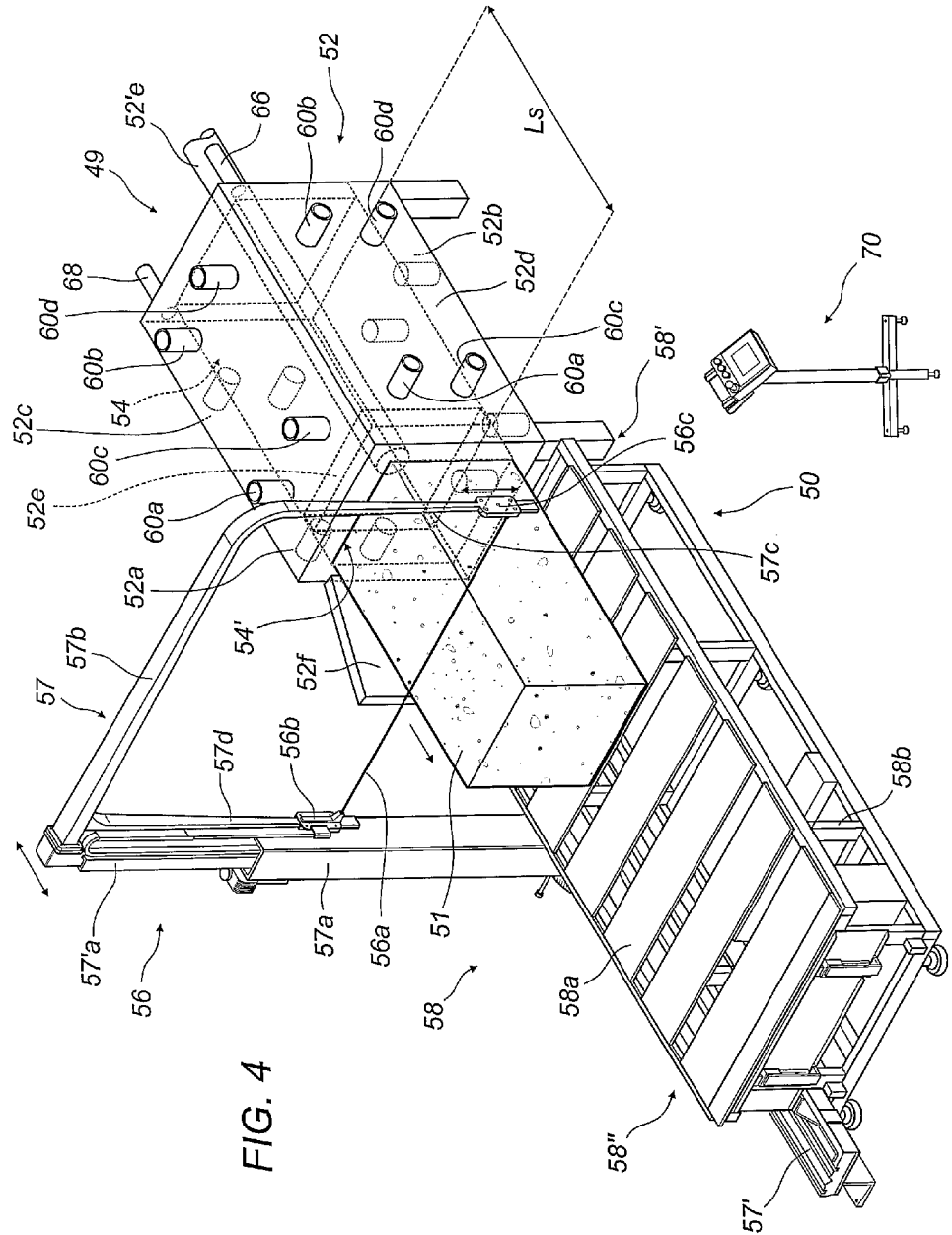

At this point the front door 52f of the mould 52 is opened and the expulsion piston, or pusher, 49, performing a stroke with length "Ls", expels a front portion of the material just formed from the mould, keeping a rear portion 51' of this block in the mould forming chamber 54, as illustrated in FIG. 4.

In this condition, the front of the block just formed rests on the supporting surface 58.

At this point, the pusher 49 returns to its retracted starting position, with a corresponding backward return stroke, and another block 55 of polystyrene or the like is moulded or formed, as indicated above, that is to say by feeding a predetermined portion of material then injecting the expansion steam under pressure into the compartment delimited in the longitudinal direction by the front face 54e of the rear wall 52e of the mould and by the rear face 51' of the block previously formed and laterally, or on the outside, by the respective inner face 54a, 54b, 54c, 54d of the lateral or outer walls 52a, 52b, 52c, 52d.

The block 55 formed in this way adheres to the face 51a of the block previously formed, forming a joint working block 51.

Once the second block of material is also complete, the pusher 49 again expels the material from the mould 52, again keeping a rear end 51' of the material inside the mould. For this purpose, the piston 49 always performs the outward stroke "Ls", which is less than the length of the forming chamber 54. In this way the pusher 49 forms advantageous feed means for the extended working block 51. The length of the extended working block 51 is greater than that of the mould 52.

Figure 5:
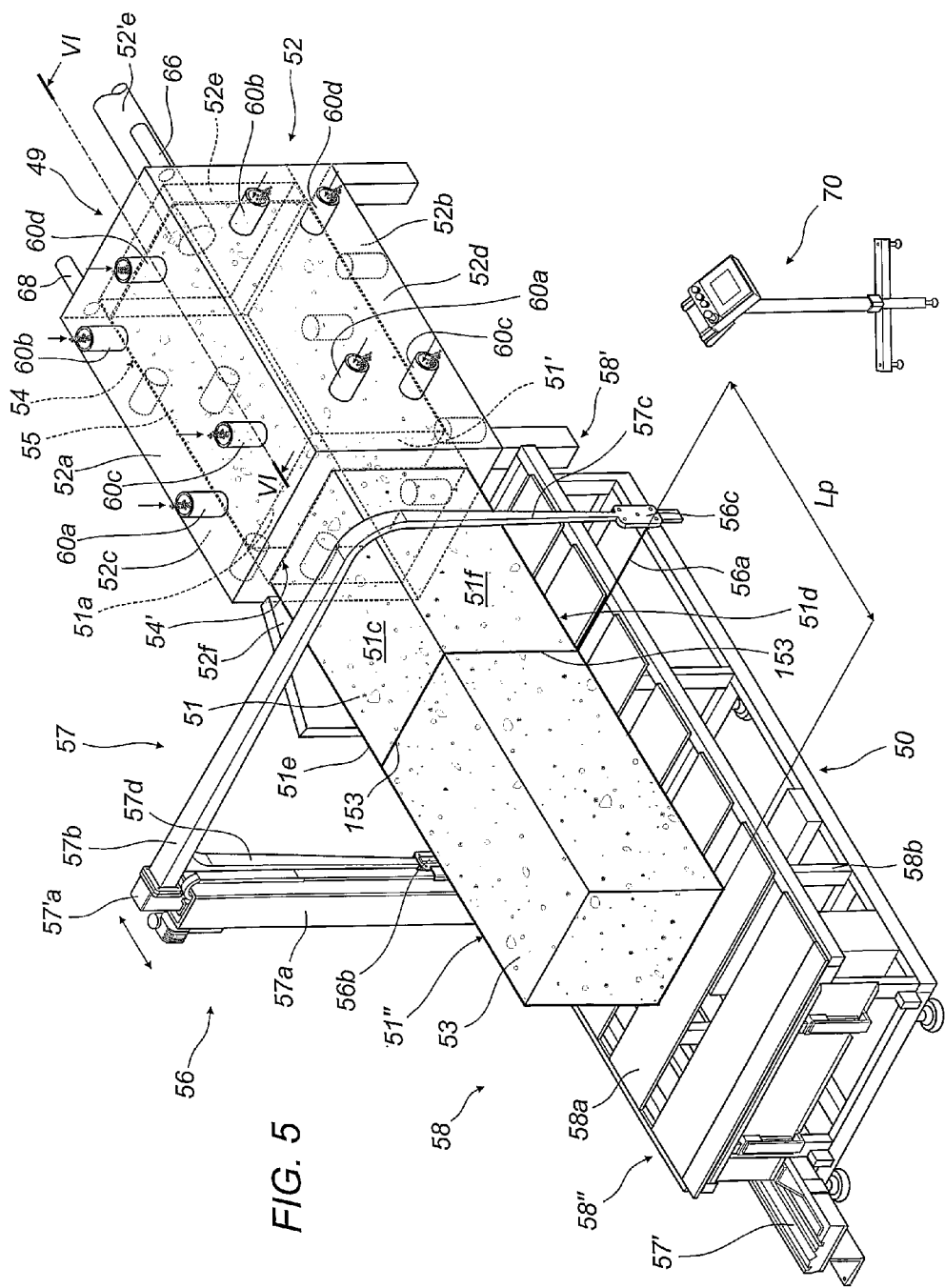
Figure 6:
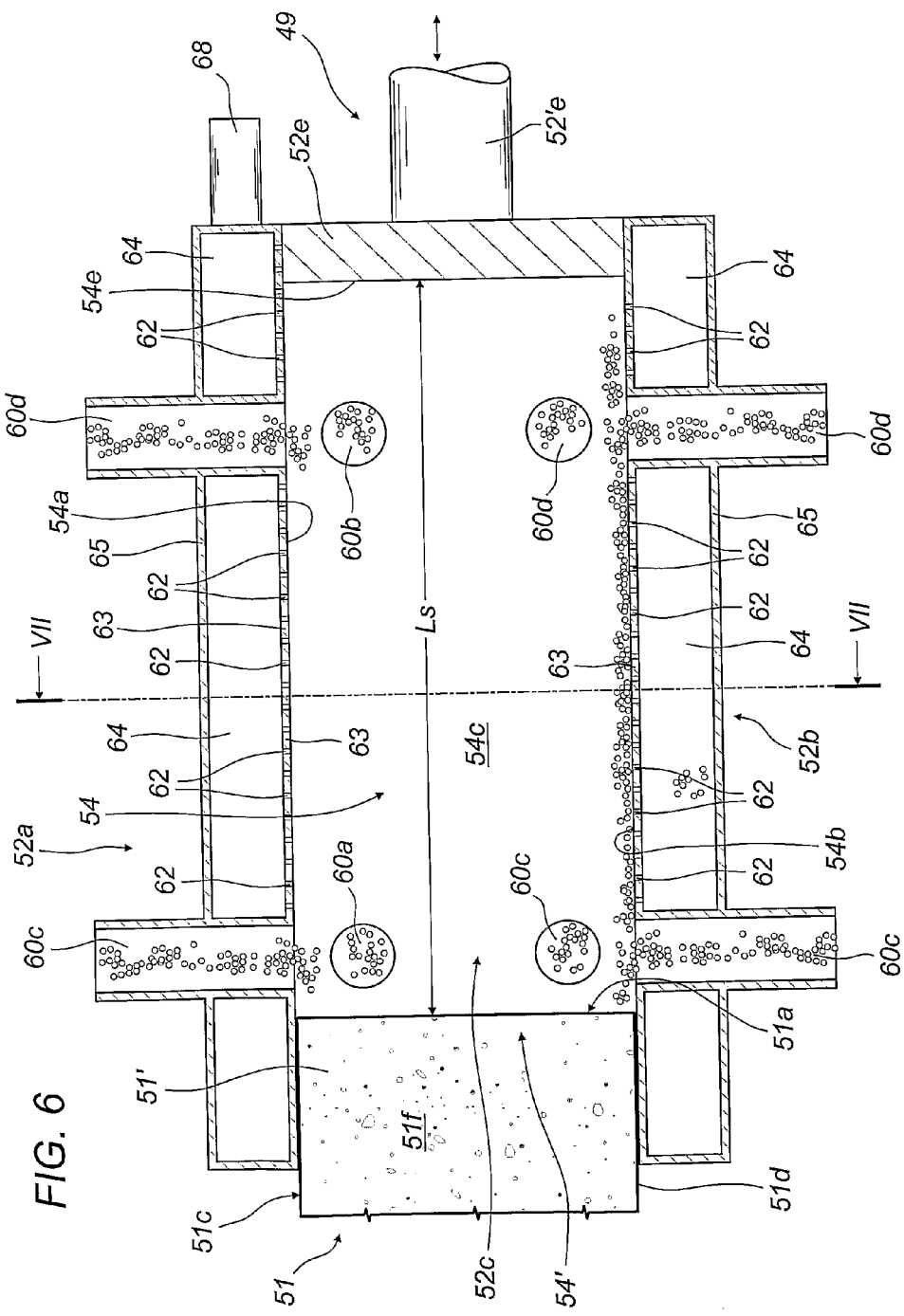
FIG. 6 is a longitudinal section, according to the line VI-VI in FIG. 5, of a preferred embodiment of the mould used in the second embodiment of the apparatus, and illustrating an operating step just before that of moulding the material.
Figure 7:
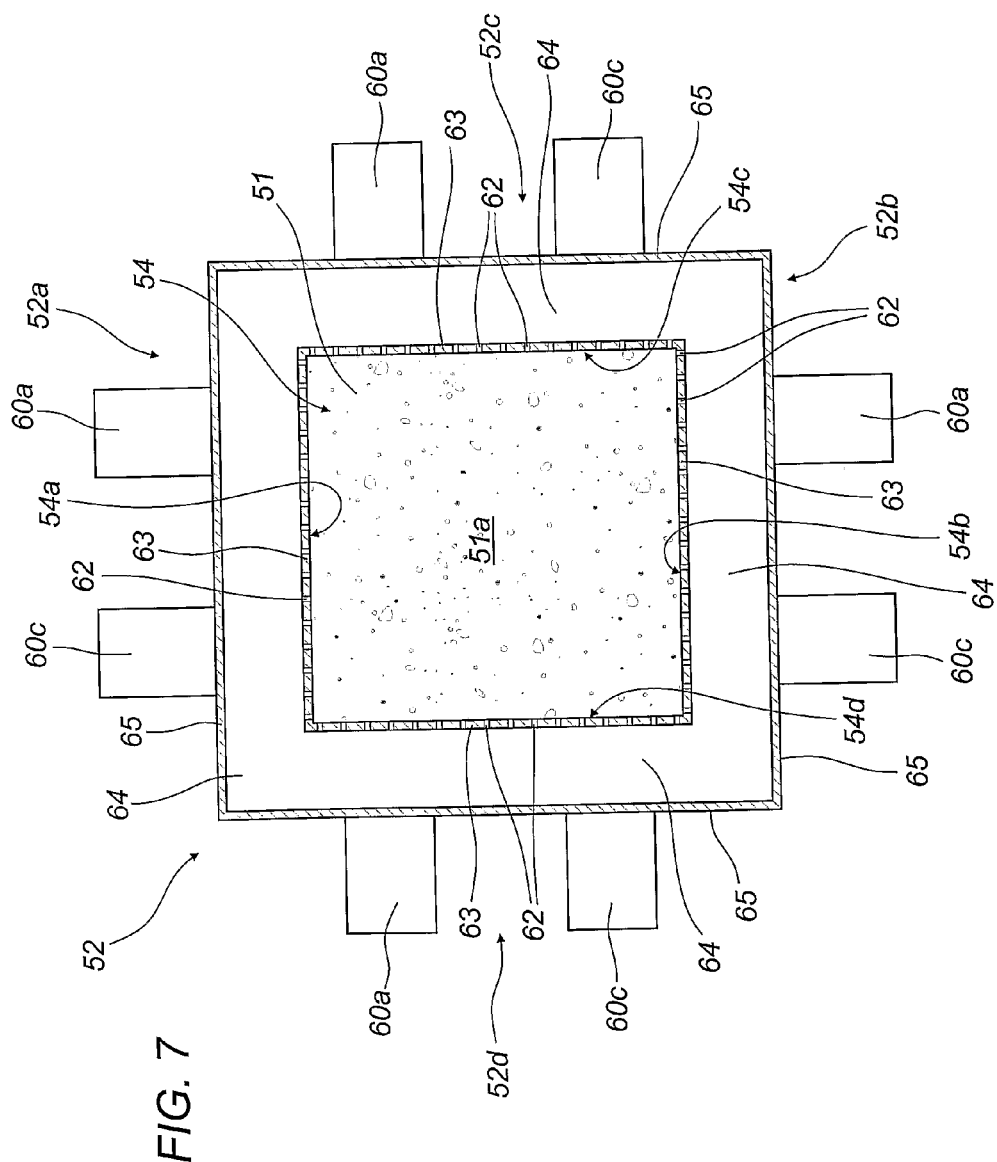
FIG. 7 is a cross-section, according to the line VII-VII in FIG. 6, of the preferred embodiment of the mould used in the second embodiment of the apparatus.

As shown in FIG. 5, during forming of a subsequent block 55, to be added to the working block 51, the cutting wire 56a cuts a corresponding predetermined block 53 having suitable length "Lp".

The predetermined block 53 is then unloaded from the material supporting and sliding surface 58.

The process and apparatus disclosed produce a working block 51 that is continuously reconstituted and from which, with corresponding cuts, blocks 53 having the desired length are obtained, from which panels for use in the construction sector can be obtained.

According to one characteristic of the invention, the working block 51 is produced with the desired dimensions, in particular length, and in such a way as to obtain corresponding blocks and avoid the waste material produced in accordance with the prior art.

As the detailed description above of preferred, non-limiting embodiments makes clear, the process and apparatus constitute an innovative technology for producing parts, preferably made of expanded polystyrene, preferably in the form of slabs or panels, which allow waste material to be minimised, or without waste and disposal problems.

The invention described above is susceptible of industrial application and may be modified and adapted in several ways without thereby departing from the scope of the inventive concept. Moreover, all the details of the invention may be substituted by technically equivalent elements.

The invention claimed is:

1. An apparatus for producing blocks of material for producing a building structure, the material being an expanded polystyrene, the apparatus comprising:
   means for forming a working block including the material;
   means designed for forming the working block by a plurality of forming steps;
   means for obtaining a predetermined block of material from the working block comprising means for separating the predetermined block from the working block;
   a mold configured to form a basic block of material that is adhered to a previously-formed block to form the working block, the mold including a forming chamber defined by a plurality of lateral walls and a rear wall, the forming chamber being open at a front thereof, in the forming chamber, the previously-formed block includes means for closing a front opening of the forming chamber during a dwell step of forming the basic block, the basic block being formed by the forming chamber receiving the material that is fed into the forming chamber and receiving a working fluid that is fed into the forming chamber to cause expansion and reciprocal adhesion of polystyrene spheres of the basic block and adhesion of the basic block to the previously-formed block; and
   means for cutting the predetermined block from the working block in a dwell condition in which the working block is partially disposed within the mold and partially extended from the mold, the means for cutting comprising a supporting frame and a cutting element moving between a raised and retracted position and a lowered and forwarded position relative to the supporting frame to provide a plurality of predetermined blocks having variable lengths,
   wherein the means for cutting is longitudinally movable relative to the mold on a corresponding track or guide extending longitudinally parallel with a supporting surface for the working block to a respective longitudinal distance relative to the mold at which the predetermined blocks are cut to a predetermined length during the dwell step of forming the basic block, and the respective longitudinal distance of the cutting means from the mold being selectively modifiable to produce varying lengths of the predetermined blocks, and
   wherein a movement of the cutting element is coincident with formation of the basic block of the material in the mold and adhesion of the basic block to the previously-formed block.

2. The apparatus according to claim 1, further comprising means for adding the basic block of material to the working block, by forming the basic block in contact with a rear end of the working block.

3. The apparatus according to claim 1, wherein the mold has a door which is configured to open.

4. The apparatus according to claim 1, wherein one of the lateral walls of the mold can move between a position in which the mold is closed and a position in which one or more of the working block of material, the predetermined block of material, and the basic block of material being released, allowing the one or more blocks of material to be fed freely.

5. The apparatus according to claim 1, wherein the means for cutting comprises a supporting frame.

6. The apparatus according to claim 5, wherein the cutting element is configured to move to a forward position for cutting the material.

7. The apparatus according to claim 5, wherein the cutting element is configured to move from a retracted position which allows transit of an end part of the working block.

8. The apparatus according to claim 1, wherein the basic block is provided within the mold during the dwell condition of the working block.

9. An apparatus for producing blocks of material for producing a building structure, the material being an expanded polystyrene, the apparatus comprising:

a mold configured to form a working block including the material and a basic block of material, the basic block of material being formed adhered to a previously-formed block to form the working block, the mold including a forming chamber in which the working block and the basic block are formed, the forming chamber defined by a plurality of lateral walls and a rear wall, the forming chamber being open at a front thereof, in the forming chamber, the previously-formed block includes means for closing a front opening of the forming chamber during a dwell step of forming the basic block, the forming chamber receiving the material that is fed into the forming chamber and receiving a working fluid that is fed into the forming chamber to cause expansion and reciprocal adhesion of polystyrene spheres of the basic block and adhesion of the basic block to the previously-formed block, in order to form the basic block; and a cutting device configured to separate a predetermined block of material from the working block by cutting the predetermined block from the working block in a dwell condition in which the working block is partially disposed within the mold and partially extended from the mold, the cutting device comprising a supporting frame and a cutting element moving between a raised and retracted position and a lowered and forwarded position relative to the supporting frame to provide predetermined blocks having variable lengths, wherein the cutting device is longitudinally movable relative to the mold on a corresponding track or guide extending longitudinally parallel with a supporting surface for the working block to a respective longitudinal distance relative to the mold at which the predetermined blocks are cut to a predetermined length during the dwell step of forming the basic block, and the respective longitudinal distance of the cutting device from the mold being selectively modifiable to provide varying lengths of the predetermined blocks, wherein a movement of the cutting element is coincident with formation of the basic block of the material in the mold and adhesion of the basic block to the previously-formed block.

10. The apparatus according to claim 9, wherein the basic block is provided within the mold during the dwell condition of the working block.

11. The apparatus according to claim 1, wherein the dwell condition of the working block coincides with formation of the basic block of material in the mold and addition of the basic block to the working block.

12. The apparatus according to claim 8, wherein the dwell condition of the working block coincides with formation of the basic block of material in the mold and addition of the basic block to the working block.

* * * * *